United States Patent
Ilg et al.

(10) Patent No.: US 12,231,523 B2
(45) Date of Patent: Feb. 18, 2025

(54) METHOD FOR LOCATION ATTESTATION FOR A DEVICE CONNECTED TO A NETWORK

(71) Applicant: Robert Bosch GmbH, Stuttgart (DE)

(72) Inventors: Niclas Ilg, Ammerbuch (DE); Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/469,160

(22) Filed: Sep. 18, 2023

(65) Prior Publication Data

US 2024/0114082 A1    Apr. 4, 2024

(30) Foreign Application Priority Data

Sep. 23, 2022  (DE) .................... 10 2022 210 077.8

(51) Int. Cl.
  *G06F 15/16*  (2006.01)
  *H04L 67/52*  (2022.01)
  *H04L 69/16*  (2022.01)

(52) U.S. Cl.
  CPC ............ *H04L 69/161* (2013.01); *H04L 67/52* (2022.05)

(58) Field of Classification Search
  CPC .............................. H04L 69/161; H04L 67/52
  USPC ......................................................... 709/230
  See application file for complete search history.

(56) References Cited

U.S. PATENT DOCUMENTS

2009/0247189 A1*  10/2009  Sennett ................... H04W 4/02
                                                      455/456.2
2010/0210280 A1*  8/2010   Haynes ................ G01S 5/0242
                                                      455/456.1

* cited by examiner

*Primary Examiner* — Alan S Chou
(74) *Attorney, Agent, or Firm* — NORTON ROSE FULBRIGHT US LLP; Gerard A. Messina

(57) ABSTRACT

A method for location attestation for a device connected to a network. The method includes: ascertaining at least one initial fingerprint, wherein the at least one initial fingerprint is specific to an initial network environment of the device in the network; storing the at least one ascertained initial fingerprint as a reference; ascertaining at least one current fingerprint, wherein the at least one current fingerprint is specific to a current network environment of the device on the network; comparing the at least one ascertained current fingerprint with the reference; verifying a geographic location of the device at least partially based on the comparison.

9 Claims, 2 Drawing Sheets

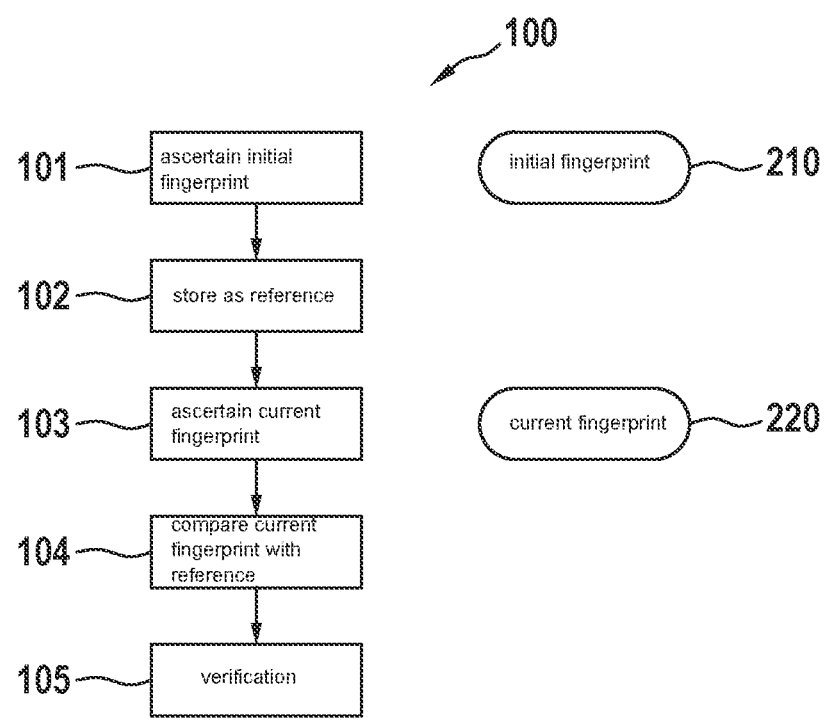

METHOD FOR LOCATION ATTESTATION FOR A DEVICE CONNECTED TO A NETWORK

CROSS REFERENCE

The present application claims the benefit under 35 U.S.C. § 119 of German Patent Application No. DE 10 2022 210 077.8 filed on Sep. 23, 2022, which is expressly incorporated herein by reference in its entirety.

FIELD

The present invention relates to a method for location attestation for a device connected to a network. Furthermore, the present invention relates to a computer program and to a device for this purpose.

BACKGROUND INFORMATION

Various methods for examining a computer network are described in the related art. The term "OS fingerprinting" includes, for example, methods for recognizing the operating systems of devices in a network. This is made possible by observing the response patterns of the devices in the network. A particularly common method for OS fingerprinting is TCP/IP stack fingerprinting.

TCP/IP stack fingerprinting itself is a well-known technique for remotely recognizing the features of a TCP/IP stack implementation. This takes advantage of the fact that certain parameters within the TCP protocol definition are left to the implementation. Different operating systems and different versions of the same operating system set different default values for such TCP/IP fields, for example:

Initial packet size (16 bits),
Initial TTL, time to live (8 bits),
Receive window size (16 bits),
Maximum segment size (16 bits),
Window scale option (8 bits),
"Don't fragment" flag (1 bit),
"sackOK" flag (1 bit),
"nop" flag (1 bit)

The combination of such values may be used to access the operating system of the remote computer and thus allow the network to be examined by means of OS fingerprinting.

Similarly, application-level services may return a so-called banner if a client initiates a new connection (even if such connection is terminated shortly thereafter). For example, an Ubuntu system running SSH would return:

~ $ nc 192.168.101.139 22
SSH-2.0-OpenSSH_5.9p1 Debian-5ubuntu1.1

By recognizing such features at the application level, it is thus possible to examine the network by means of service fingerprinting.

As a rule, TCP/IP and service fingerprinting is carried out during the reconnaissance phase of a cyberattack, in order to ascertain the operating system version of the target system. This, in turn, enables the attacker in selecting a suitable exploit on the basis of one or more known vulnerabilities in such operating system version (if any exist and are known).

SUMMARY

An object of the present invention includes providing a method, a computer program, and a device for location attestation for a device connected to a network. Features, example embodiments, and details of the present invention will become apparent from the disclosure herein. Here, features and details which are described in connection with the method according to the present invention naturally also apply in connection with the computer program according to the present invention and the device according to the present invention, and vice versa in each case, so that with regard to the disclosure, reference to the individual aspects of the present invention is always made reciprocally or can be so made.

In particular, the method according to the present invention may be used for location attestation for a device connected to a network. For example, the device may be designed as a household appliance or a robot or a vehicle or the like. For example, the device comprises a computer and/or a microcontroller and/or a processor and/or a screen.

For connection to the network, the device may further have a network interface, preferably a radio interface. The radio interface is, for example, a Bluetooth or WLAN interface or the like. The device may be designed to execute at least one safety-related function, such as controlling the vehicle or providing an anti-theft device of the device. It may be possible that such safety-relevant function is dependent on a location of the device. For example, a change of location may trigger an alarm from the anti-theft system. It is therefore advantageously provided in the device that a location of the device is to be repeatedly verified.

The method according to an example embodiment of the present invention may provide a solution for location attestation. Here, the following steps may be provided, which are preferably carried out one after the other or in any order, preferably on an automated basis and/or by at least one computer and/or at least partially by the device:

ascertaining at least one initial fingerprint, wherein the at least one initial fingerprint is specific to an initial network environment of the device in the network, and thus in particular is specific to an initial geographic location of the device, wherein preferably the initial network environment is the network environment at the point in time of the ascertainment of the initial fingerprint, wherein preferably the network environment is composed of the further devices in the network, storing the at least one ascertained initial fingerprint as a reference, preferably in a non-volatile data memory of the device or in the cloud (for example, in a server, which may receive the initial fingerprint via the network by data transmission), ascertaining at least one current fingerprint, wherein the at least one current fingerprint is specific to a current network environment of the device in the network, and thus in particular is specific to a current geographic location of the device, comparing the at least one ascertained current fingerprint with the reference, verifying a geographic and/or physical location of the device based at least partially on the comparison, preferably to verify that the initial geographic location matches the current geographic location.

The method according to the present invention may have the advantage of providing a reliable possibility for verifying a location with little technical effort. For example, the effort required is much less than when using many conventional technologies for tracking.

According to an example embodiment of the present invention, each fingerprint may be designed as a piece of digital information comprising, for example, values and/or details specific to the network environment. For example, each fingerprint may also comprise a list of identifiers of at least one other device in the network. Accordingly, each fingerprint may also be referred to as network information, which is stored in a non-volatile form, for example as a file or data.

The initial geographic location may further be the location of the device that is current at the point in time of ascertaining the at least one initial fingerprint. Verifying the geographic location may preferably mean checking whether the current geographic location still matches the initial geographic location. In other words, the verification of the location may be done, for example, to attest that the device is still in the same geographic location as it was when the initial fingerprint was ascertained. Of course, minor deviations may be tolerated here. It is also possible that the device was previously localized using another positioning technology such as GPS (Global Positioning System), which is to be attested to by the verification.

In particular, a feature of the present invention includes that the network environment may be used to check the location, since the network environment provides a fingerprint for geographic location. The fact that the network environment is identical or very similar at another geographic location is assumed to be very unlikely.

Hereafter, location attestation is specifically referred to as the ability of a connected device to check its physical location. The determination of the physical location is also called localization. The connected device may, for example, be connected to other devices via a network. In particular, a network is a computer network, and thus an association of various technical, primarily independent electronic devices, wherein the network enables the individual devices to communicate with each other electronically. Here, communication may take place via a TCP (Transmission Control Protocol) and/or an IP (Internet Protocol) protocol, for example. A TCP is a connection-oriented, packet-switched transport protocol that defines how data is to be exchanged between devices on the network.

The network may further be or have a connection to the Internet. Accordingly, the network may also have a local area network such as a LAN (Local Area Network) or WLAN (Wireless Local Area Network) or be designed as such. Furthermore, at least one of the following technologies may be used for data transmission in the network: Ethernet, Token Ring, PowerLAN, a radio network such as a mobile network, preferably LTE or 5G, WLAN, Bluetooth.

Further, at least one of the following network components may be connected in the network: gateway, router, switch, access point, repeater and bridge. The network may be at least partially wired and/or at least partially wireless.

According to an example embodiment of the present invention, the device may be, for example, an electronic device, preferably a control device, for example for a vehicle, or a computer or a household appliance or a robot or the like. Further, the device may have a network interface, such as a wireless interface, to connect to the network. Preferably, the device is connected to a local area network in which other devices (for example, in a household) are provided. The network can usually be used to ascertain the identifiers of such other devices, such as the services or operating systems offered. A combination of such identifiers may be used to ascertain the relevant fingerprint. Thus, a change in the location or network environment results in a change in the fingerprint. Thus, based on a magnitude of this change, a change in location may be inferred. In particular, the method step of comparison may determine this change, wherein the method step of verification may determine the extent of the change.

The method according to the present invention may be used, for example, in the field of highly automated driving, for example for a plausibility check for the location of the vehicle. Use in the field of robotics is also possible, for example for anti-theft protection for mobile robots, for example lawn mowers. In addition, use in the field of smart homes is possible, for example for two-factor or three-factor authentication of users or devices, whereby the attestation of a location may be one of the factors. In the field of mobility, for example, the method may be used for keyless access, and/or in the field of building technologies for indoor navigation. In these fields in particular, depending on the device and environment, traditional methods such as GPS-based or beacon-based tracking may have inadequate performance (for example, GPS in indoor spaces or in difficult terrain), may be too costly (for example, a GPS chip increases technical complexity) or require a specific technology (for example, Bluetooth beacons necessarily require the device to have a Bluetooth LE radio). Therefore, it is possible to propose, through the method according to the present invention, an alternative solution for carrying out the attestations of locations in a network that preferably uses TCP for the transport layer and/or provides known services at the application layer.

Preferably, according to an example embodiment of the present invention, it may be provided that each ascertainment of the fingerprint comprises:
  carrying out an examination, in particular a scan, preferably a port scan, of the network environment of the device on the network,
  ascertaining the fingerprint based at least partially on a result of the examination carried out.

For example, at least one of the following scan methods is carried out for the scan: TCP connect( ) scan, TCP SYN scan, TCP FIN/Xmas/Null scan, TCP Idlescan, UDP scan, FTP bounce scan, OS fingerprinting (recognition of operating systems), service recognition (also called service fingerprinting), TCP/IP stack fingerprinting.

For example, it may be provided that each ascertainment of the fingerprint is carried out at least partially or entirely by the device, so that each fingerprint is specific to the network environment of the device in the network, preferably in a local area network. For this purpose, the device has, for example, a data processing device that may be electronically connected to a data memory in order to store the respective fingerprints therein, i.e. in particular to store them in a non-volatile manner.

According to an example embodiment of the present invention, preferably, it may be provided that the respective fingerprints are specific to the network environment of the device due to the fact that each fingerprint comprises at least one identifier of at least one further device in the network, wherein preferably the at least one identifier is ascertained by an examination, preferably a scan, of the network environment. For example, a port scanner or software based on a port scanner may be used for the scan. The identifier may comprise, for example, information about a type of operating system and/or about at least one service of the relevant further device.

Furthermore, according to an example embodiment of the present invention, it may be provided within the scope of the present invention that the at least one identifier is ascertained at least partially based on a recognized operating system of the further device and/or a service offered in the network, wherein preferably OS fingerprinting and, in particular, TCP/IP stack fingerprinting, and/or service fingerprinting are carried out for this purpose. This has the advantage that the environment of the network and thus the geographic location may be reliably identified. The method may further have the advantage of being technology-independent with respect to the physical data link layers and network layers of the OSI model. In this manner, it may be used with devices that support TCP/IP and/or provide application-level services over the network (for example, SSH, web servers, etc.).

Optionally, according to an example embodiment of the present invention, it is possible that the steps of ascertaining the at least one current fingerprint and/or comparing and/or verifying are carried out repeatedly and/or are triggered by a location attestation request. The location attestation request may be triggered, for example, automatically repeatedly, for example, in a manner dependent on time, and/or may be triggered by a user and/or triggered via the network by a data processing device, for example via the Internet as well. It is also possible for the location attestation request to be triggered by an external, safety-related event, such as a vibration in a robotic lawnmower.

According to an example embodiment of the present invention, in a further possibility, it may be provided that, through the verification, it is attested that a geographic location to be checked corresponds to a current geographic location of the device, wherein the geographic location to be checked is provided by the location attestation request and/or is an initial geographic location of the device at the point in time of ascertaining the initial fingerprint. It is possible, for example, that the device was previously localized by another technology such as GPS (Global Positioning System), which is to be attested to by the verification. The geographic location to be checked may be included by the location attestation request, for example, and transmitted to the device. Furthermore, the location to be checked may also be the previous location, so that the location attestation request is only intended to check that the location of the device has not changed.

According to a further possibility of the present invention, it may be provided that a configuration is carried out, wherein the verification evaluates a match of the at least one current fingerprint with the reference based on the comparison, wherein the configuration indicates the level of match at which attestation occurs through the verification that the geographic location to be checked corresponds to the current geographic location of the device. Thus, a type of threshold or tolerance may be provided, so that even a small change (such as the replacement or elimination or addition of a further device) does not cause the verification of location to be negative.

Further, according to an example embodiment of the present invention, it is possible that an action is carried out based on the verification using a response configuration, wherein the action preferably comprises: continuing a normal operation of the device if the attestation is performed via the verification, and otherwise transferring the device to a safety operation. For example, the response configuration may be stored, for example, in a data memory of the device and/or in the cloud, and/or may be customizable by a user. The response configuration may specify which action is carried out and/or how this action is configured.

The present invention also relates to a computer program, in particular a computer program product, comprising instructions which, when the computer program is executed by a computer, cause the computer to carry out the method according to the present invention. The computer program according to the present invention thus brings with it the same advantages as have been described in detail with reference to a method according to the present invention.

For example, a data processing device which executes the computer program can be provided as the computer. The computer can have at least one processor for executing the computer program. A non-volatile data memory can also be provided, in which the computer program is stored and from which the computer program can be read by the processor for execution.

The present invention may also relate to a device for data processing that is configured to carry out the method according to the present invention.

The present invention also relates to a computer-readable storage medium which comprises the computer program according to the present invention. The storage medium is designed, for example, as a data memory such as a hard drive and/or a non-volatile memory and/or a memory card. The storage medium can be integrated into the computer, for example.

Furthermore, the method according to the present invention may also be designed as a computer-implemented method.

Further advantages, features and details of the present invention will become apparent from the following description, in which exemplary embodiments of the present invention are described in detail with reference to the figures. The features mentioned in the description can be essential to the present invention in each case individually or in any combination.

BRIEF DESCRIPTION OF THE DRAWINGS

FIG. 3 shows a schematic representation of method steps, according to an example embodiment of the present invention.

DETAILED DESCRIPTION OF EXAMPLE EMBODIMENTS

In the following figures, the identical reference signs are used for the same technical features even of different exemplary embodiments.

Figure 1:
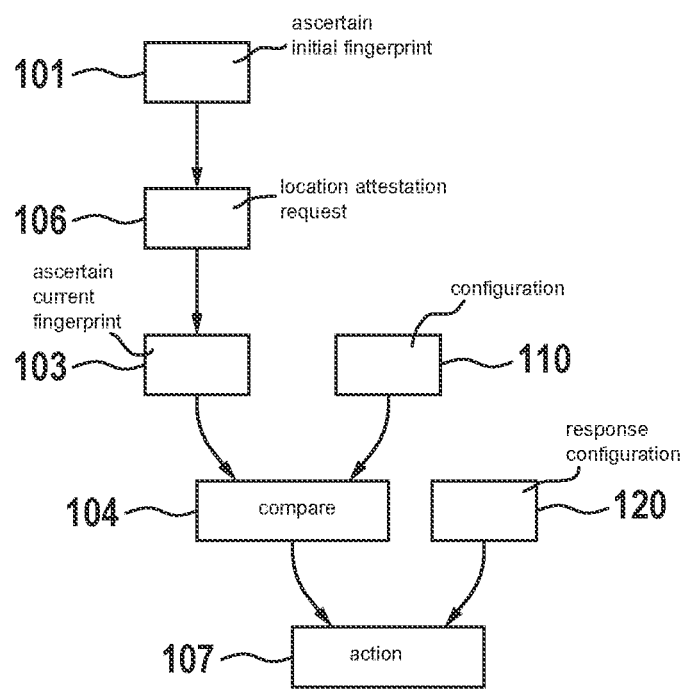
FIG. 1 shows a schematic representation of an exemplary embodiment of the present invention by a flowchart.
Figure 2:
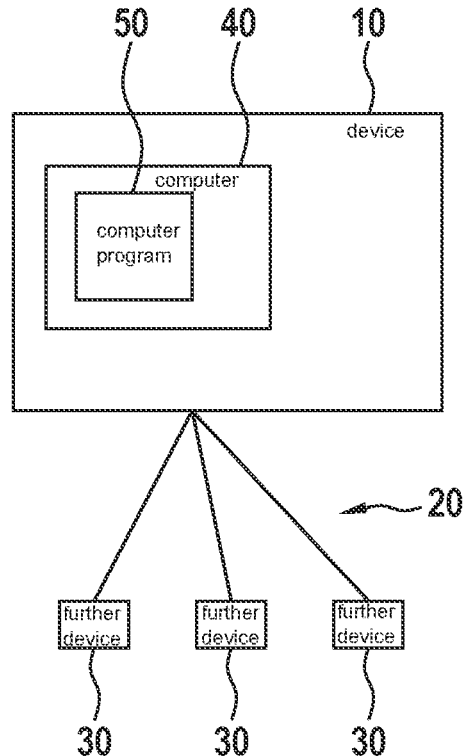
FIG. 2 shows a schematic representation of a further exemplary embodiment of the present invention.

FIGS. 1 to 3 show an exemplary method 100 according to the present invention for location attestation for a device 10 connected to a network 20.

FIG. 3 illustrates the method steps of the method 100. According to a first method step 101, ascertaining at least one initial fingerprint 210 is performed, wherein the at least one initial fingerprint 210 is specific to an initial network environment of the device 10 (shown in FIG. 2) in the network 20. Subsequently, according to a second method step 102, the at least one ascertained initial fingerprint 210 is stored as a reference 210. Thereafter, according to a third method step 103, ascertaining at least one current fingerprint 220 is performed, wherein the at least one current fingerprint 220 is specific to a current network environment of the device 10 in the network 20. Then, according to a fourth method step 104, a comparison of the at least one ascertained current fingerprint 220 with the reference 210 is performed in order to subsequently enable a verification of a geographic location of the device 10 at least partially based on the comparison 104 according to a fifth method step 105.

Each ascertainment 101, 103 of the fingerprint 210, 220 may comprise carrying out an examination, in particular a scan, of the network environment of the device 10 in the network 20, in order to subsequently ascertain the relevant fingerprint 210, 220 at least partially based on a result of the examination carried out. Each ascertainment 101, 103 of the fingerprint 210, 220 may be carried out at least partially or completely by the device 10, so that the relevant fingerprint 210, 220 is specific to the network environment of the device 10 in the network 20, preferably in a local area network 20. Further, the respective fingerprints 210, 220 may be specific to the network environment of the device 10 due to the fact that each fingerprint 210, 220 comprises at least one identifier of a further device 30 on the network 20.

FIG. 1 further illustrates that the steps of ascertaining 103 the at least one current fingerprint 220 and/or comparing 104 and/or verifying 105 may be triggered by a location attestation request 106. Further, a configuration 110 may be provided, wherein the verification 105 evaluates a match of the at least one current fingerprint 220 with the reference 210 based on the comparison 104, wherein the configuration 110 indicates the level of match at which attestation occurs by verifying 105 that a geographic location to be checked corresponds to the current geographic location of the device 10. Moreover, it is possible that an action 107 is carried out based on the verification 105 based on a response configuration 120, wherein the action 107 preferably comprises: continuing a normal operation of the device 10 if the attestation is performed via the verification 105, and otherwise transferring the device 10 to a safety operation.

In particular, an idea underlying the present invention is that attestation of a location is possible by verifying a geographic location based on a fingerprint, which may be ascertained by scanning the network environment. In principle, such a scan may correspond to the function of a port scanner, with which the IP addresses of the environment are scanned. Such scan checks, for example, which services a system working with TCP or UDP offers via the Internet protocol.

An embodiment of the present invention is shown with further details in FIG. 1. In this regard, initially, during initial location fingerprinting 101, the device 10 (which is to carry out the attestation of a location) may take at least one or more initial fingerprints 210 from its network environment (also referred to as network surroundings) after receiving a location attestation request 106, i.e., from other devices 30 connected to the same (in particular, local) network 20 as the device 10, preferably using TCP/IP and/or application-level services (for example, SSH). The fingerprint may subsequently be stored. At a later point in time, when the device 10 receives a new location attestation request 106, the device 10 may carry out fresh location fingerprinting 103 and again take at least one or more fingerprints 220 from its network environment to ascertain a new fingerprint 220, and compare it to the previously stored fingerprint 210.

The result of the comparison may subsequently be compared with configuration 110. Here, the configuration 110 may determine how strict (from a safety perspective) the comparison should be. On the basis of the result of comparing the configuration, the device 10 may subsequently carry out the action specified in a response configuration 120.

In the exemplary embodiment shown in FIG. 1, the attestation of a location may be performed on the basis of at least one fingerprint 210 of the network environment. This at least one fingerprint 210 may be composed of, for example, the operating system and/or service fingerprints of the other devices in the network found during an initial scan of the network environment.

This initial fingerprint 210 may thus serve as a reference fingerprint, or reference for short. For the later attestation of a location, a fingerprint 220 may again be ascertained and compared with the reference fingerprint. The configuration 110 specifies how strict the comparison should be. For example, a "k out of n" comparison may be performed. For example, the configuration 110 could specify that at least ⅔ of the initially found additional devices 30 stored in the reference fingerprint must be found in the new fingerprint 220.

Depending on the use case, the response to a failed comparison (i.e., the fingerprint 220 of the new location does not match the original fingerprint 210) may comprise the following actions:
  Switching a vehicle's safety component and/or safety functions to a conservative or safeguarded mode, for example, preventing the use of certain functions,
  Switching the vehicle's safety components and/or functions to a more restrictive mode (for example, "limp home" mode),
  Temporarily disabling features of the system (for example, a lawn mower) and, optionally, requesting attestation from the legitimate user (for example, via an app or web portal) that the system has not been stolen.

In this manner, the device 10 is transferred to a safety mode in each case.

FIG. 2 further shows an exemplary computer program 50 and a device 40 for processing data.

The above description of the embodiments describes the present invention exclusively in the context of examples. Of course, individual features of the embodiments, provided they make technical sense, can be freely combined with one another without departing from the scope of the present invention.

What is claimed is:

1. A method for location attestation for a device connected to a network, comprising the following steps:
  ascertaining at least one initial fingerprint, wherein the at least one initial fingerprint is specific to an initial network environment of the device in the network;
  storing the at least one ascertained initial fingerprint as a reference;
  ascertaining at least one current fingerprint, wherein the at least one current fingerprint is specific to a current network environment of the device on the network;
  comparing the at least one ascertained current fingerprint with the reference; and
  verifying a geographic location of the device at least partially based on the comparison, wherein the initial fingerprint and the current fingerprint are specific to a network environment of the device due to the fact that each of the initial fingerprint and the current fingerprint includes at least one identifier of a further device in the network, the at least one identifier being ascertained by an examination, including a scan, of a network environment, and wherein the at least one identifier is ascertained at least partially based on a recognized operating system of the further device and/or a service offered in the network, wherein OS fingerprinting including TCP/IP stack fingerprinting and/or service fingerprinting are carried out for this purpose.

2. The method according to claim 1, wherein the ascertaining of the initial fingerprint and the ascertaining of the current fingerprint each includes:

carrying out an examination, including a scan, of a network environment of the device in the network; and ascertaining the initial fingerprint and the ascertaining of the current fingerprint are at least partially based on a result of the examination carried out.

3. The method according to claim 1, wherein the ascertaining of the initial fingerprint and the ascertaining of the current fingerprint are each carried out at least partially or completely by the device, so that the initial fingerprint and the current fingerprint is specific to a network environment of the device in a local area network.

4. The method according to claim 1, wherein the ascertaining the at least one current fingerprint and/or the comparing (104) and/or the verifying are repeatedly carried out and triggered by a location attestation request.

5. The method according to claim 4, wherein, through the verification, it is attested to that a geographic location to be checked corresponds to a current geographic location of the device, wherein the geographic location to be checked is provided by the location attestation request and/or is an initial geographic location of the device at a point in time of the ascertaining of the initial fingerprint.

6. The method according to claim 5, wherein a configuration is provided, wherein the verification evaluates a match of the at least one current fingerprint with the reference based on the comparison, wherein the configuration indicates a level of match at which attestation occurs through the verification that the geographic location to be checked corresponds to the current geographic location of the device.

7. The method according to claim 1, wherein an action is carried out based on the verification using a response configuration, wherein the action includes: continuing a normal operation of the device when the attestation is performed via the verification, and otherwise transferring the device to a safety operation.

8. A non-transitory computer-readable medium on which is stored a computer program including instructions for location attestation for a device connected to a network, the instructions, when executed by a computer, causing the computer to perform the following steps:

ascertaining at least one initial fingerprint, wherein the at least one initial fingerprint is specific to an initial network environment of the device in the network;

storing the at least one ascertained initial fingerprint as a reference;

ascertaining at least one current fingerprint, wherein the at least one current fingerprint is specific to a current network environment of the device on the network;

comparing the at least one ascertained current fingerprint with the reference; and verifying a geographic location of the device at least partially based on the comparison, wherein the initial fingerprint and the current fingerprint are specific to a network environment of the device due to the fact that each of the initial fingerprint and the current fingerprint includes at least one identifier of a further device in the network, the at least one identifier being ascertained by an examination, including a scan, of a network environment, and wherein the at least one identifier is ascertained at least partially based on a recognized operating system of the further device and/or a service offered in the network, wherein OS fingerprinting including TCP/IP stack fingerprinting and/or service fingerprinting are carried out for this purpose.

9. A first device for data processing, the device being configured location attestation for a device connected to a network, the first device for data processing configured to:

ascertain at least one initial fingerprint, wherein the at least one initial fingerprint is specific to an initial network environment of the device in the network;

store the at least one ascertained initial fingerprint as a reference;

ascertain at least one current fingerprint, wherein the at least one current fingerprint is specific to a current network environment of the device on the network;

compare the at least one ascertained current fingerprint with the reference; and verify a geographic location of the device at least partially based on the comparison, wherein the initial fingerprint and the current fingerprint are specific to a network environment of the device due to the fact that each of the initial fingerprint and the current fingerprint includes at least one identifier of a further device in the network, the at least one identifier being ascertained by an examination, including a scan, of a network environment, and wherein the at least one identifier is ascertained at least partially based on a recognized operating system of the further device and/or a service offered in the network, wherein OS fingerprinting including TCP/IP stack fingerprinting and/or service fingerprinting are carried out for this purpose.

\* \* \* \* \*